United States Patent
Howell

(10) Patent No.: US 7,180,477 B2
(45) Date of Patent: Feb. 20, 2007

(54) PORTABLE AUTOMATIC TEST INSTRUMENT FOR VIDEO DISPLAYS AND GENERATORS

(75) Inventor: David Howell, St. James, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 88 days.

(21) Appl. No.: 10/706,451

(22) Filed: Nov. 12, 2003

(65) Prior Publication Data

US 2005/0099362 A1    May 12, 2005

(51) Int. Cl.
    *G09G 1/06* (2006.01)
(52) U.S. Cl. .................. 345/10; 345/204; 348/180; 324/770
(58) Field of Classification Search ................. 345/10, 345/204, 904; 348/180, 181, 189; 324/770
    See application file for complete search history.

(56) References Cited

U.S. PATENT DOCUMENTS 5,440,339 A * 8/1995 Harrison et al. ............ 348/189
5,874,991 A * 2/1999 Steinberg et al. ........... 348/181
6,396,536 B1   5/2002 Howell
6,502,045 B1   12/2002 Biagiotti

* cited by examiner

Primary Examiner—Jimmy H. Nguyen
(74) Attorney, Agent, or Firm—Brian Roffe

(57) ABSTRACT

Portable automatic video device tester including a programmable video generator and analyzer, a signal conditioner/switching device, a command module, a portable computer (laptop) with an integral monitor and a portable VXI chassis for housing the video generator and analyzer, the signal conditioner/switching device and the command module. The programmable video generator and analyzer is connected to one or more video devices being tested and includes a generating mechanism for generating various forms of video test signals. The signal conditioner/switching device is also arranged in connection with the chassis and adapted to be connected to one or more of the video devices being tested. The computer communicates with the video generator and analyzer and the signal conditioner/switching device via the command module in order to conduct test operations and enable display of test results on the monitor.

28 Claims, 4 Drawing Sheets

PORTABLE AUTOMATIC TEST INSTRUMENT FOR VIDEO DISPLAYS AND GENERATORS

FIELD OF THE INVENTION

The present invention relates to the field of portable automatic test equipment for testing electronic video devices, and more particularly, to portable automatic test equipment for video displays and generators.

BACKGROUND OF THE INVENTION

For thorough testing of video displays, video stimuli, ranging from simple to complex, multiple format video signals, are required. For the thorough testing of video generators, the real-time capture and analysis of complex video signals, for both format and image content, are required. For both display and generation testing, general purpose measurement capabilities including, but not limited to; voltage, resistance, frequency, time interval and waveform analysis (both time and frequency domain) are also required Portable automatic test equipment for the testing of video devices is known. However, it is commonly required to evaluate the performance and functionality of application specific non-standard video displays. Specifically, the video displays may require special image and scan formats, voltage levels, and timing signals. In addition, fault simulation may be required to verify the functionality of the video display. For the evaluation of video generators, an apparatus for both displaying and analyzing video signals of any format is required. In a portable realization, size and weight are critical.

OBJECTS AND SUMMARY OF THE INVENTION

It is an object of the present to provide a new and improved apparatus for portable testing of electronic video devices.

It is another object of the present invention to provide new and improved general-purpose test capability from a specialized device to maximize functionality while minimizing size and weight.

In order to achieve these objects and others, a portable automatic video device tester generally includes a programmable video generator and analyzer, a signal conditioner/switching device, a command module, a portable computer (laptop) with an integral monitor and a portable VXI chassis. The command module, the computer and the VXI chassis may be commercial off the shelf components, with the command module being arranged in connection with the chassis. The programmable video generator and analyzer is arranged in connection with the chassis and adapted to be connected to one or more video devices being tested, i.e., it is possible to simultaneously test multiple video devices in accordance with the invention. The video generator and analyzer includes a generating mechanism for generating various forms of video test signals. The signal conditioner/switching device is also arranged in connection with the chassis and adapted to be connected to one or more of the video devices being tested. The computer communicates with the video generator and analyzer and the signal conditioner/switching device via the command module in order to conduct test operations and enable display of test results on the monitor.

The combination of the foregoing elements in a single automatic video testing device provides a complete and versatile portable tester encompassing both video and general-purpose capabilities. The programmable video generator and analyzer may be a VXI register based, single "C" size, instrument intended for use in automatic test equipment. It can also include two composite (raster) video generator functional groups, one stroke (XYZ) video generator functional group and one multi-video capture/redisplay functional group.

More specifically, the programmable video generator and analyzer may include a primary raster video generator for generating high-resolution bit-mapped images for cathode ray tube (analog) and flat panel (digital) displays, a secondary raster video generator and timer module for generating medium resolution bit-mapped images in multiple synchronized scan formats, and a stroke generator for generating stroke.

The programmable video generator and analyzer and its associated software are preferably designed to provide all video capabilities for both generation and capture/analysis. The signal conditioner/switching device may be a VXI register based, single "C" size, instrument intended for use in automatic test equipment. It may include four signal conditioning modules and two groups of switches. Each signal-conditioning module provides the necessary signal conditioning to enable the programmable video generator and analyzer to emulate a type of general-purpose instrument: digital multi-meter, counter/timer, digitizer/oscilloscope and digital pulse generator. The two switching groups select between the video and general-purpose instrumentation.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 2:
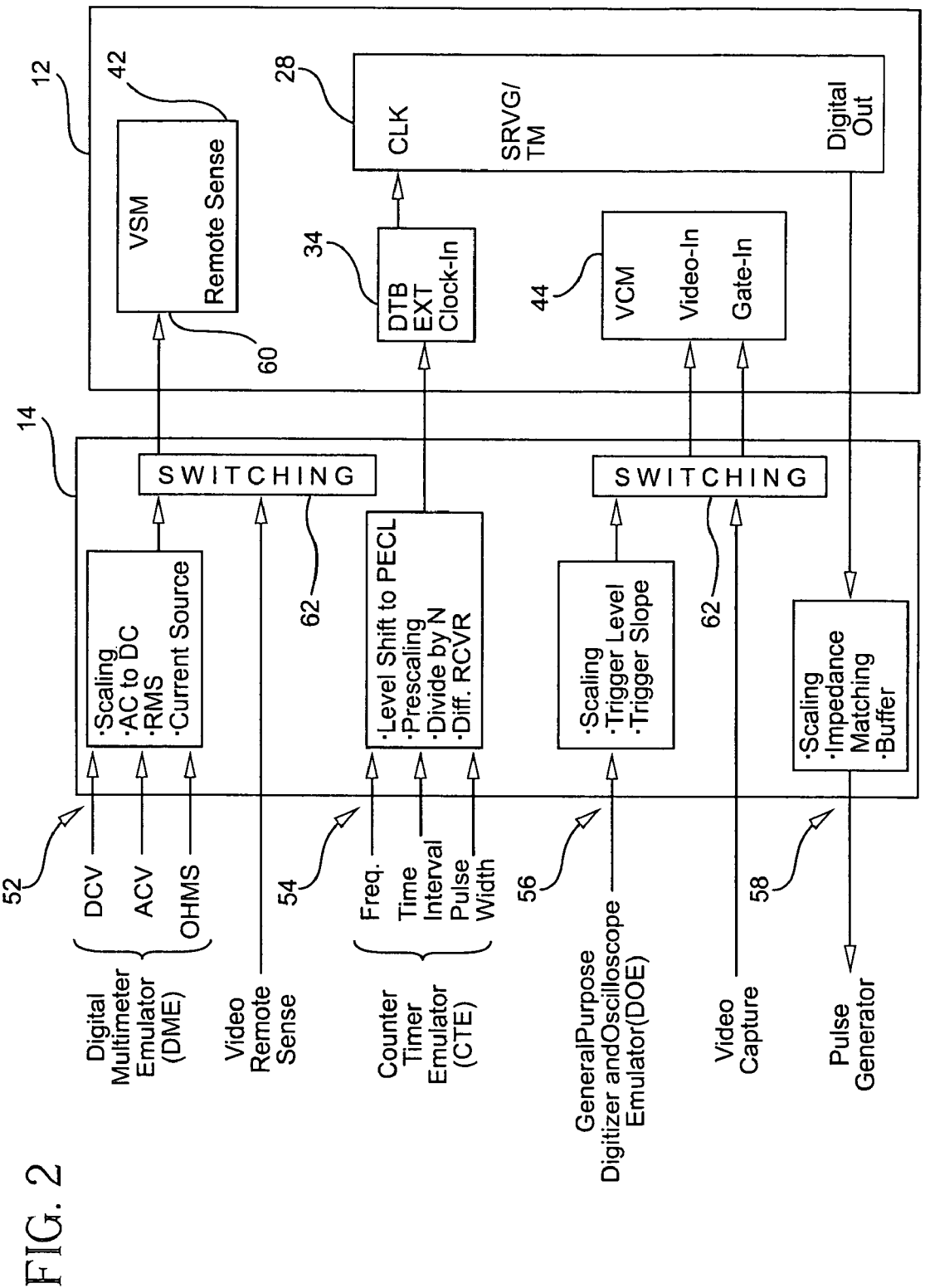
FIG. 2 is a schematic of a signal conditioning/switching device of an automatic test instrument in accordance with the invention and its connection to the video generator and analyzer shown in FIG. 1.
Figure 3:
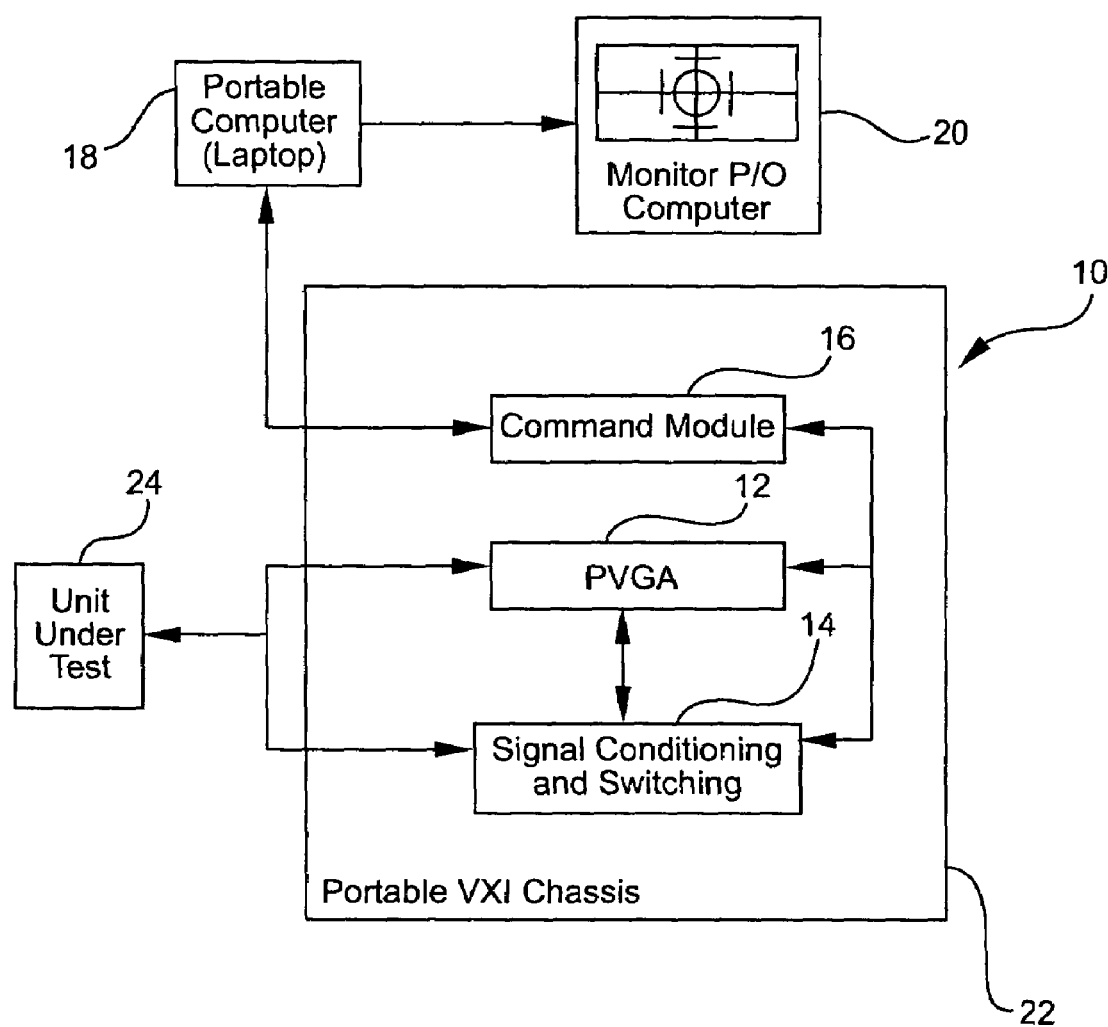
FIG. 3 is a schematic of a portable automatic test instrument in accordance with the invention.

Referring to the accompanying drawings wherein the same reference numerals refer to the same or similar elements, a portable automatic video test analyzer in accordance with the invention is generally designated as 10 and generally includes a Programmable Video Generator and Analyzer (PVGA) 12, such as of the type disclosed in the current assignee's U.S. Pat. No. 6,396,536, incorporated by reference herein in its entirety (shown in FIG. 1), a Signal Conditioner/Switching Device (SC/SD) 14 (shown in FIG. 2), a COTS command module 16, a COTS portable computer (laptop) 18 with an integral monitor 20 and a COTS portable VXI chassis 22 (see FIG. 3).

The computer 18 conducts all test operations and displays the results on its integral monitor 20. The computer 18 is coupled to and communicates with the PVGA 12 and the SC/SD 14 through the Command Module 16. All signals to and from a Unit Under Test 24, both stimulus and response signals, are routed to/from the PVGA 12 either directly or via the SC/SD 14. Signals are also exchanged between the PVGA 12 and the SC/SD 14 via a signal coupling. The VXI chassis 22 provides the necessary system interconnect, power conditioning, cooling and housing functions.

The automatic video test analyzer 10 provides a complete and versatile portable video tester by utilizing the attributes of its components, namely, the attributes of the PVGA 12, the SC/SD 14 and the portable computer 18 with its integral monitor 20. In particular, the automatic video test analyzer 10 utilizes the video specific capabilities of the PVGA 12, the general-purpose test capabilities of the PVGA 12 as augmented by ancillary hardware of the SC/SD 14, or other stand-alone VXI instruments, and the capability to redisplay any video images on the monitor 20 of the portable computer 18.

The following description explains the operation of an exemplifying embodiment of the automatic video test analyzer 10 in accordance with the invention as it functions to test video signals.

A. Video Testing—Generation

Figure 1:
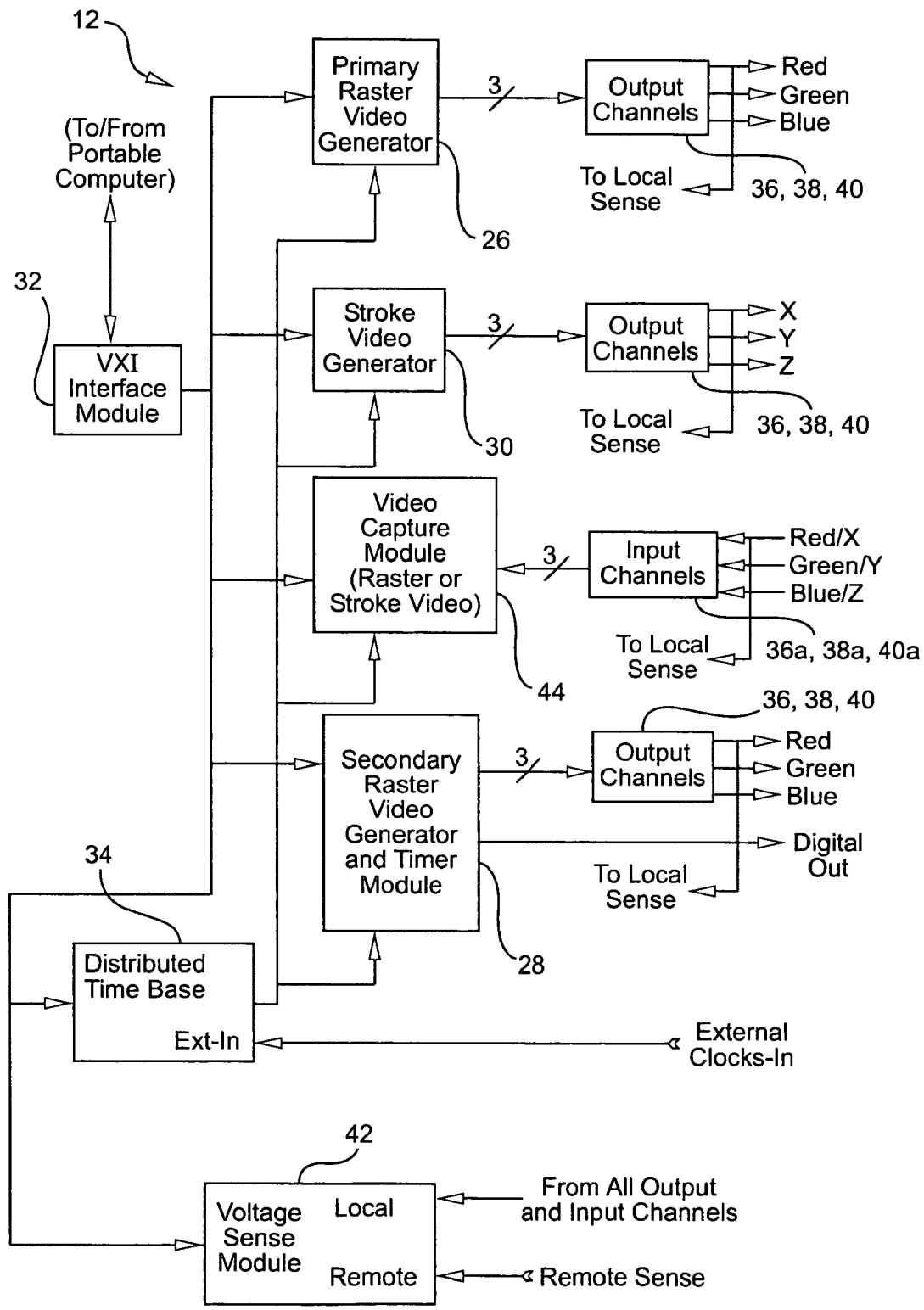
FIG. 1 is a schematic of a programmable video generator and analyzer for use in a portable automatic test instrument in accordance with the invention.

All video generation by the automatic video test analyzer 10 is handled directly by the PVGA 12. With reference to FIG. 1, the PVGA 12 has three modules that produce video in various forms, namely a Primary Raster Video Generator (PRVG) 26, a Secondary Raster Video Generator and Timer Module (SRVG/TM) 28 and a Stroke Video Generator (SVG) 30. The three generation modules (PRVG 26, SRVG/TM 28 and SVG 30) of the PVGA 12 are controlled by the portable computer 18 via a VXI Interface Module (VIM) 32. The time base, or clock, for each module is supplied by the Distributed Time Base (DTB) 34 which can also connect any of the modules to an external clock.

The Primary Raster Video (PRVG) 26 generates high-resolution bit-mapped images for cathode ray tube (analog) and flat panel (digital) displays. Standard and non-standard scan formats, both synchronized and deflection driven, are directly supported by the PRVG 26. An internal dedicated drawing engine greatly accelerates the loading of the image into the bit map. A dynamic overlay image may be superimposed on the main image. The dynamic overlay can be updated from frame to frame as to content, position, or foreground/background status. In addition, the overlay can be modulated (on/off) by an external digital signal provided by the VXI interface module 32. For Units Under Test 24 that require direct analog raster scan deflection waveforms, the PRVG 26 is designed to provide these in multiple formats.

The Secondary Raster Video Generator and Timer Module (SRVG/TM) 28 generates medium resolution bit-mapped images in any synchronized scan format. The purpose of the SRVG/TM 28 is to produce a second video signal of either identical or different format than that of the PRVG 26. The two video signals, one from the PRVG 26 and another from the SRVG/TM 28, can be used together to test multi-scan monitors, video switching systems, channel isolation and the like, or separately to simultaneously test multiple displays. The Timer Module portion of the SRVG/TM 28 provides a mechanism for measuring time intervals (either one-shot or cumulative) or frequency. The Timer Module portion of the SRVG/TM 28 also produces programmable digital patterns (Digital Out) that may be buffered and routed to the digital connector of the PVGA 26.

The Stroke Generator (SVG) 30 produces stroke, or X-Y-Z video in which the image is drawn on the screen by directly deflecting the beam along the lines of the image being drawn. Complex, interactive images can be produced by the SVG 30 by means of its programmable sequence control structure that controls the order, duration, and position of image elements. Image control can be a mix of internal, external, or real time software.

Associated with each of the above modules, i.e., the PRVG 26, the SRVG/TM 28 and the SVG 30, are a set of output channels 36, 38, 40, respectively, three low voltage channels (Red, Green, Blue) for the PRVG 26, three low voltage channels (Red, Green, Blue) for the SRVG/TM 28 and three high voltage channels (X, Y, Z) for the SVG 30. All of these output channels is aligned at run time by means of a Voltage Sense Module (VSM) 42 controlled by the computer 18 via the VXI interface module 32.

The VSM 42 is a multi-channel high accuracy differential voltage sense circuit with an integral voltage reference source. The VSM 42 can sense the voltage at all relevant points on the sets of output channels 36, 38, 40. The host computer 18 reads the voltage at these points and calculates the transfer characteristics of the channel being aligned. The sets of output channels 36, 38, 40 utilize digitally controlled gain and offset circuits to set each channel's operational parameters.

To achieve the desired characteristics, an output alignment software driver resident in the host computer 18 compares the sensed transfer characteristics with the specified transfer characteristics, calculates the necessary corrections, and writes them to the output channel being aligned. This arrangement permits the channels to be aligned at the time of use to parameters called for in the test program set (TPS) program. Since the channels are accurately aligned at run time, essentially all long term drift errors are eliminated.

For greater accuracy, the VSM 42 provides a remote sense capability so that the output voltages are sensed directly at the inputs of the Unit Under Test 24, thus eliminating the effect of cable losses and ground offsets.

B. Video Testing—Capture

Figure 4A:
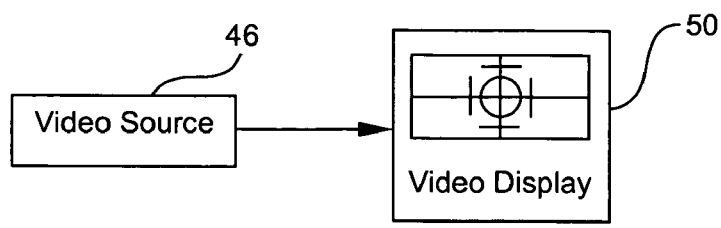
FIG. 4A is a schematic showing the route between the video source and the video display in an operational, i.e. non-test, mode.
Figure 4B:
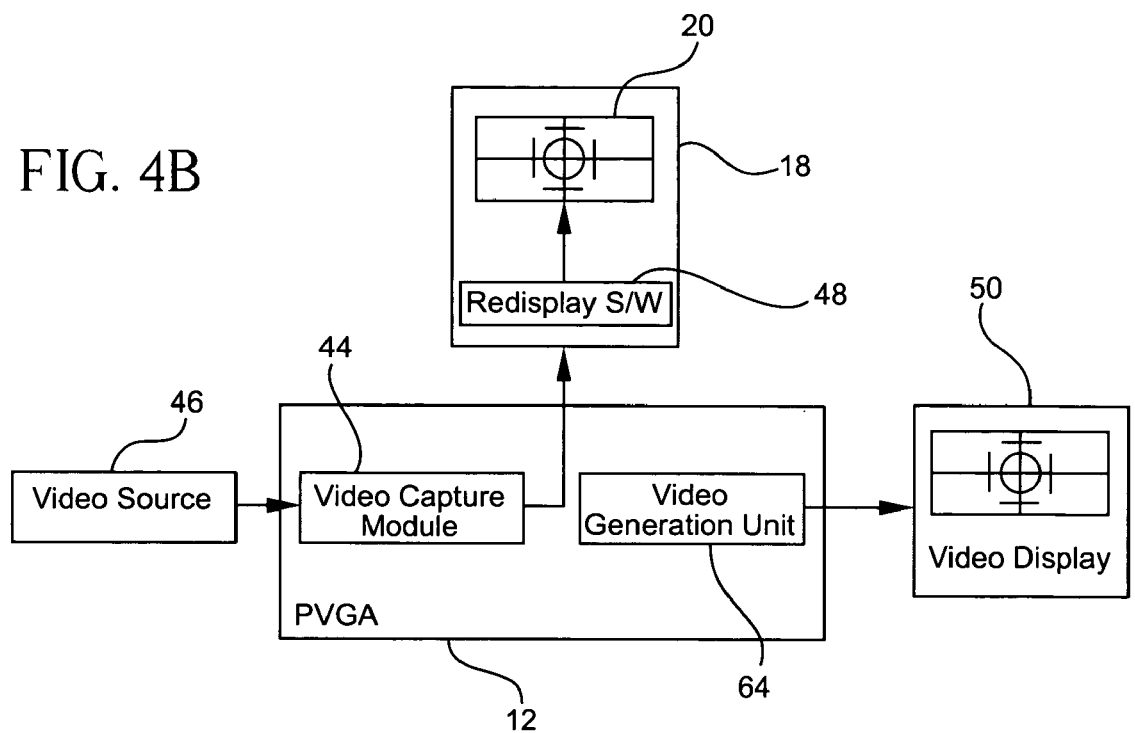
FIG. 4B is a schematic showing the route between the video source, the portable automatic test instrument and the video display in a test mode.

All video generation is handled direct by a video capture module 44 of the PVGA 12 (see FIG. 4B). The Video Capture Module (VCM) 44 performs one-shot full frame video image capture on both analog and digital video in either synchronized or deflection driven format. For synchronized video, the VCM 44 has an adaptive sync lock that locks on the input synchronization signal even if the signal is marginal. The VCM 44 can acquire images without restriction as to frame/line rate, voltage levels or sync format. The VCM 44 is controlled by the portable computer 18 via the VXI Interface Module (VIM) 32. The time base, or clock, for the VCM 44 is supplied by the Distributed Time Base (DTB) 34 which can also connect any of the modules to an external clock.

Once an image from the video source 46 is acquired by the video capture module 44, the image can be immediately redisplayed via a Redisplay Software Tool 48 onto the monitor 20 of the host computer 18 (see FIG. 4B).

The VCM 44 can capture video signal in several modes with differing data widths and rates as follows:

1. Three channel operation—for color synchronized video (red, green and blue) and stroke video (X axis deflection, Y axis deflection and Z axis intensity) or deflection driven video (horizontal deflection, vertical deflection and intensity) at 12 bits resolution up to 20 MHz or 8 bits resolution up to 40 MHz. To capture stroke video or deflection driven video, the two deflections, X (horizontal) and Y (vertical), and the intensity Z, are sampled and stored concurrently. The hardware of the VCM 44 will reassemble the captured image by using the X and Y deflection samples as orthogonal vectors into its memory space and the intensity Z samples as the data.

2. Single channel operation—for monochrome video or one of the three channel type signal above at 12 resolution up to 40 MHz or 8 bits resolution up to 80 MHz.

The VCM 44 accepts externally applied triggers and gates. In the gate mode, video capture will begin when the externally applied is asserted and video capture will halt when the gate is de-asserted. Gate mode is intended for use with stroke capture when the VCM 44 is free-running during the capture interval. For synchronized video, the trigger mode allows the user to select which full frame of video is captured. When the trigger is asserted, the VCM 44 will halt at the end of the current frame.

The VCM 44 has three input channels that have digitally controlled gain and offset. As with the output channels discussed above, the input channels are aligned at run time via the VSM 44 and an input alignment software driver.

C. Video Testing—Example

FIGS. 4A and 4B show a typical application of the automatic video test analyzer 10 for remote video testing. As shown, a video source 46 drives a video display 50. To effectively fault-detect and isolate, it is necessary to both analyze the output of the video source 46 and drive the video display 50 with appropriate test images. FIG. 4B shows how this is effectively accomplished.

First, the VCM 44 captures the video from the video source 46 under test. Once captured, the Redisplay Software Tool 48 uploads the formatted image from the PVGA 12 and transfers it to the monitor 20 of the computer 18. The Redisplay Software Tool 48 provides a set of analysis tools such as overlaying of oscilloscope-like grids, automatic determination of pixel location, detailed waveform analysis and measurement of sync/blanking/active video patterns for each line, and the like.

An important aspect of this method is that no external monitor or display device is required to analyze any video image, i.e., the computer's integral monitor 20 is sufficient for all video testing.

In addition to capturing and analyzing the output of the video source 46, the automatic video test analyzer 10 will also generate whatever video test image is required to fully exercise the display under test (i.e., the video display 50). The inherent flexibility of the generation capability of the PVGA 12 allows it to test any display. Non-standard video is produced as readily as standard format video. If necessary for complete testing or fault isolation, deliberately corrupted video can be generated.

D. General Purpose Testing

A combination of the PVGA 12 and dedicated modules of the SC/SD 14 realize all general-purpose instrumentation. The modules of the SC/SD 14 include a Digital Multi-Meter Emulator (DME) 52, a Counter/Timer Emulator (CTE) 54, a Digitizer/Oscilloscope Emulator (DOE) 56 and a Pulse Generator Buffer (PGB) 58.

The DME 52 works in conjunction with a remote sense port 60 of the VSM 42. Since the remote sensing ports 60 of the VSM 42 represent high impedance, accurate DC measurement assets, all that is required to fully emulate a DME 52 is scaling and signal conditioning. The DME 52 provides both.

The VSM remote sense port 60 has a voltage range of +/−10 VDC. The DME 52 will include attenuation and amplification to extend the voltage range of the VSM 42 to whatever values are required. An attenuation of 10:1 increases the full accuracy range to +1–100 VDC, an amplification of 10 yields a full accuracy range of +/−1 VDC, and so on. Once the input voltage has been scaled to +/−10 VDC range of the VSM 42, further conditioning is available. An AC to RMS converter extends the capability of the emulated DME 52 to cover AC voltages. A voltage-limited programmable current source applied to the input when reading DC voltage will produce accurate resistance measurements.

Associated with the DME 52 is a group of switches 62 that will connect the remote ports of the VSM 42 either to the DME 52 for voltage and resistance measurements or directly to the video inputs of the Unit Under Test 24 for optimal output alignment as discussed above.

With respect to the Counter/Timer Emulator (CTE) 54, in order to realize counter/timer functions in the automatic video test analyzer 10, the Timer Module portion of the SRVG/TM 28 will serve as the measurement asset and the CTE 54 will provide the necessary signal conditioning.

An optimal path to the SRVG/TM 28 is via the externally applied PVGA clocks. Clock generation and distribution is the function of the Distributed Time Base (DTB) 34, a module in the PVGA 12 (see FIG. 1.). The DTB 34 contains four high-resolution frequency synthesizers. The synthesizers are individually dedicated to the PRVG 26, SRVG/TM 28, SVG 30 and VCM 44. This allows each module of the PVGA 12 to have an independent clock frequency and also permits fully synchronous operation due to the common reference oscillator.

The DTB 34 can also buffer, level shift and route external clocks to each module. The external clocks of the PVGA 12 may be differential Positive Emitter Coupled Logic (PECL).

The CTE 54 will translate the input level to differential PECL. A programmable high-speed comparator, configurable as either single-ended or differential, will sample the input signal at a user specified threshold voltage and convert the resulting signal to differential PECL. Prescaling in the CTE 54 will extend the frequency measurement range of the Timer Module portion of the SRVG/TM 28 to whatever range is required. A programmable divider will extend the range of the Timer Module for time interval measurement.

The Digitizer/Oscilloscope Emulator (DOE) 56 works in conjunction with the VCM 44 of the PVGA 12. In order to use the capabilities of the VCM 44 for a general waveform capture and display application, external gate and triggers must be derived from the input signal. To emulate a typical oscilloscope, the input signal will compared with a user-specified threshold and polarity. When the input reaches the specified state, the DOE 56 will generate a gate pulse. The VCM 44 will be setup for a gated, free running mode, the same as for stroke capture.

The user specified duration of the gate pulse, with an appropriate sampling rate of the VCM 44, determines the length of the sample and is therefore analogous to the time/division setting on an oscilloscope. The user-specified delay between the threshold comparison and the start of the gate corresponds to the delayed trigger function on an oscilloscope. Immediately upon completion of the sampling, the Redisplay Software Tool 48 displays the captured waveform along with appropriate grids and legends on the computer integral monitor.

The Pulse Generator Buffer (PGB) 58 works in conjunction with the SRVG/TM 28 of the PVGA 12. The Timer Module portion of the SRVG/TM 28 can produce a wide range of clock signals based on either its local fixed oscillator or the programmable clock from the DTB 34. In addition, the video portion of the SRVG/TM 28 can produce arbitrary complex digital patterns. These digital signals may be in transistor-transistor logic Transistor-Transistor Logic (TTL) form. The PGB 58 in the SC/SD 14 will accept the TTL level inputs and level shift them to user-specified voltages. The output buffer will provide high current output drive and impedance matching.

The basic structure of the automatic video test analyzer 10 described above can be readily modified to suit any given set of requirements. If additional functionality or greater accuracy is required, one can augment the PVGA 12 and SC/SD 14 with one or more COTS VXI instruments residing in either the same or a separate chassis.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A portable analyzer for testing video devices, comprising:
   a portable chassis;
   a programmable video generator and analyzer housed in said chassis and adapted to be connected to at least one video device being tested, said video generator and analyzer including generating means for generating various forms of video test signals;
   a signal conditioner/switching device housed in said chassis and adapted to be connected to the at least one video device being tested, said signal conditioner/switching device being coupled to said video generator and analyzer and including at least one emulator arranged between the at least one video device and said video generator and analyzer to modify signals from the at least one video device and provide the modified signals to said video generator and analyzer;
   a command module housed in said chassis; and
   a portable computer including a monitor, said computer being arranged to communicate with said video generator and analyzer and said signal conditioner/switching device via said command module in order to conduct test operations and enable display of test results on said monitor; wherein said at least one emulator provides scaling and signal-conditioning of an input voltage, translates an input signal level to differential Positive Emitter Coupled Logic (PECL), or provides a Transistor-Transistor Logic (TTL) level digital trigger signal and a TTL level gate signal, according to input signals.

2. The analyzer of claim 1, wherein said computer is programmed to route signals to and from the at least one video device being tested to and from said video generator and analyzer directly or indirectly via said signal conditioner/switching device.

3. The analyzer of claim 1, wherein said generating means comprise a primary raster video generator for generating high-resolution bit-mapped images for analog cathode ray tube and digital flat panel displays, a secondary raster video generator and timer module for generating medium resolution bit-mapped images in multiple synchronized scan formats, and a stroke generator for generating stroke.

4. The analyzer of claim 3, wherein said primary raster video generator and said secondary raster video generator and timer module each generate a video signal used in combination with one another to enable testing of multi-scan monitors, video switching systems and channel isolation.

5. The analyzer of claim 3, wherein said primary raster video generator and said secondary raster video generator and timer module each generate a video signal used separately from one another to simultaneously test a plurality of video devices being tested.

6. The analyzer of claim 3, wherein a timer module portion of said secondary raster video generator and timer module is arranged to measure time intervals or frequency and produce programmable digital patterns.

7. The analyzer of claim 3, wherein said video generator and analyzer further comprises a respective set of output channels associated with each of said primary raster video generator, said secondary raster video generator and timer module and said stroke generator, said output channels for said primary raster video generator being three low voltage channels (Red, Green Blue), said output channels for said secondary raster video generator and timer module being three low voltage channels (Red, Green, Blue), and said output channels to said stroke generator being three high voltage channels (X, Y, Z).

8. The analyzer of claim 7, wherein said video generator and analyzer further comprises a voltage sense module coupled to said computer for aligning said sets of output channels at run time to thereby eliminate long term drift errors.

9. The analyzer of claim 8, wherein said voltage sense module includes a multi-channel high accuracy differential voltage sense circuit with an integral voltage reference source and senses voltage at all relevant points on said sets of output channels whereby said computer reads the voltage at these points and calculates transfer characteristics of said output channels being aligned.

10. The analyzer of claim 8, wherein said voltage sense module includes a remote sense capability so that voltages are sensed directly at inputs of the at least one video device being tested to thereby eliminate the effect of cable losses and ground offsets.

11. The analyzer of claim 1, wherein said video generator and analyzer further includes a video capture module adapted to be coupled to a video source and capable of performing one-shot full frame video image capture on both analog and digital video.

12. The analyzer of claim 11, wherein said video capture module is coupled to said computer, said computer being programmed with a redisplay tool to enable redisplay of a captured image onto said monitor of said computer.

13. The analyzer of claim 11, wherein said generating means comprise a primary raster video generator for generating high-resolution bit-mapped images for analog cathode ray tube and digital flat panel displays, a secondary raster video generator and timer module for generating medium resolution bit-mapped images in multiple synchronized scan formats, and a stroke generator for generating stroke, said video generator and analyzer further comprising a distributed time base module arranged to provide clock generation and distribution.

14. The analyzer of claim 13, wherein said distributed time base includes four frequency synthesizers, each dedicated to a respective one of said primary raster video generator, said secondary raster video generator and timer module, said stroke video generator and said video capture module to thereby enable independent clock frequencies.

15. The analyzer of claim 1, wherein said at least one emulator of said signal conditioner/switching device includes a digital multi-meter emulator, a counter/timer emulator, and a digitizer/oscilloscope emulator, said signal conditioner/switching device further comprising a pulse generator buffer.

16. The analyzer of claim 15, wherein said generating means comprise a primary raster video generator for generating high-resolution bit-mapped images for displays analog cathode ray tube and digital flat panel displays, a secondary raster video generator and timer module for generating medium resolution bit-mapped images in multiple synchronized scan formats, and a stroke generator for generating stroke, said video generator and analyzer further comprising a respective set of output channels associated with each of said primary raster video generator, said secondary raster video generator and timer module and said stroke generator and a voltage sense module coupled to said computer for aligning said sets of output channels at run time to thereby eliminate long term drift errors, said digital multi-meter emulator being operative in conjunction with a remote sense port of said voltage sense module and being arranged to provide scaling and signal conditioning.

17. The analyzer of claim 16, wherein said signal conditioner/switching device further comprises switches associated with said digital multi-meter emulator for connecting remote ports of said voltage sense module either to said digital multi-meter emulator or directly to video inputs of the at least one video device being tested.

18. The analyzer of claim 15, wherein said generating means comprise a primary raster video generator for generating high-resolution bit-mapped images for analog cathode ray tube and digital flat panel displays, a secondary raster video generator and timer module for generating medium resolution bit-mapped images in multiple synchronized scan formats, and a stroke generator for generating stroke, a timer module portion of said secondary raster video generator and timer module being arranged to measure time intervals or frequency and produce programmable digital patterns, wherein said counter/timer emulator being arranged to provide signal conditioning for said timer module.

19. The analyzer of claim 15, wherein said video generator and analyzer further includes a video capture module adapted to be coupled to a video source and capable of performing one-shot full frame video image capture on both analog and digital video, said digitizer/oscilloscope emulator being coupled to said video capture module and arranged to derive external gate pulses and triggers from an input signal.

20. The analyzer of claim 15, wherein said generating means, comprise a primary raster video generator for generating high-resolution bit-mapped images for analog cathode ray tube and digital flat panel displays, a secondary raster video generator and timer module for generating medium resolution bit-mapped images in multiple synchronized scan formats, and a stroke generator for generating stroke, said pulse generator buffer being coupled to said secondary raster video generator and timer module and arranged to generate user-specified voltages from transistor-transistor logic level inputs from said secondary raster video generator and timer module.

21. The analyzer of claim 1, wherein said at least one emulator is arranged to convert input signals from the at least one video device being tested which are in a form unprocessable by said video generator and analyzer into a form processable by said video generator and analyzer.

22. The analyzer of claim 1, wherein said at least one emulator is arranged to convert output signals from said video generator and analyzer which are in a form unprocessable by the at least one video device being tested into a form processable by the at least one video device being tested.

23. A method for testing a video device including a video source and a video display, comprising:

connecting the video source to a portable automatic video test analyzer;

capturing video from the video source by means of a video capture module in a programmable video generator and analyzer in the automatic video test analyzer;

formatting the captured image in the video generator and analyzer and displaying the formatted image on a monitor of a portable computer coupled to the programmable video generator and analyzer to enable analysis of output from the video source;

generating video test signals in the programmable video generator and analyzer;

directing the video test signals to the video display to thereby enable analysis of the displayed test signals; and coupling a signal conditioner/switching device in the automatic video test analyzer to and between the programmable video generator and analyzer and the video device, the signal conditioner/switching device including at least one emulator arranged between and coupled to the video device and the programmable video generator and analyzer to modify signals from the video device and provide the modified signals to the programmable video generator and analyzer; wherein said at least one emulator provides scaling and signal-conditioning of an input voltage, translates an input signal level to differential Positive Emitter Coupled Logic (PECL), or provides a Transistor-Transistor Logic (TTL) level digital trigger signal and a TTL level gate signal, according to input signals.

24. The method of claim 23, wherein the step of displaying the formatted image comprising at least one of determining location of pixels of the formatted image, performing detailed waveform analysis on waveforms in the formatted image and displaying the analysis and measuring sync video patterns for each line, blanking video patterns for each line and active video patterns for each line.

25. The method of claim 23, wherein the step of generating video test signals in the programmable video generator and analyzer comprises providing a primary raster video generator for generating high-resolution bit-mapped images for analog cathode ray tube and digital flat panel displays, a secondary raster video generator and timer module for generating medium resolution bit-mapped images in multiple synchronized scan formats, and a stroke generator for generating stroke such that standard, non-standard and intentionally corrupted video is generateable.

26. The method of claim 23, wherein the at least one emulator is arranged to convert input signals from the video display being tested which are in a form unprocessable by the programmable video generator and analyzer into a form processable by the programmable video generator and analyzer.

27. The method of claim 23, wherein the at least one emulator is arranged to convert output signals from the programmable video generator and analyzer which are in a form unprocessable by the video display being tested into a form processable by the video display being tested.

28. A portable analyzer for testing video devices, comprising:
   a portable chassis;
   a programmable video generator and analyzer housed in said chassis and adapted to be connected to at least one video device being tested, said video generator and analyzer including generating means for generating various forms of video test signals;
   a signal conditioner/switching device housed in said chassis and adapted to be connected to the at least one video device being tested;
   a command module housed in said chassis; and
   a portable computer including a monitor, said computer being arranged to communicate with said video generator and analyzer and said signal conditioner/switching deice via said command module in order to conduct test operations and enable display of test results on said monitor,
   said signal conditioner/switching device including a digital multi-meter emulator which provides scaling and signal-conditioning of an input voltage, a counter/timer emulator which translates an input signal level to differential Positive Emitter Coupled Logic (PECL), and a digitizer/oscilloscope emulator which provides a Transistor-Transistor Logic (TTL) level digital trigger signal and a TTL level gate signal, according to input signals.

* * * * *

UNITED STATES PATENT AND TRADEMARK OFFICE
CERTIFICATE OF CORRECTION

PATENT NO. : 7,180,477 B2  
APPLICATION NO. : 10/706451  
DATED : February 20, 2007  
INVENTOR(S) : David Howell Page 1 of 1

It is certified that error appears in the above-identified patent and that said Letters Patent is hereby corrected as shown below:

Column 7, line 5, delete "transistor-transistor logic".

Column 12, line 1, change "deice" to --device--.

Signed and Sealed this

Seventeenth Day of April, 2007

JON W. DUDAS  
*Director of the United States Patent and Trademark Office*